(12) United States Patent
Van Herpen et al.

(10) Patent No.: US 8,649,581 B2
(45) Date of Patent: Feb. 11, 2014

(54) COLOUR MANAGEMENT FOR BIOLOGICAL SAMPLES

(75) Inventors: Maarten M. J. W. Van Herpen, Eindhoven (NL); Dirk L. J. Vossen, Eindhoven (NL); Sjoerd Stallinga, Eindhoven (NL); Bernardus H. W. Hendriks, Eindhoven (NL); Erik M. H. P. Van Dijk, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 110 days.

(21) Appl. No.: 13/124,693

(22) PCT Filed: Oct. 16, 2009

(86) PCT No.: PCT/IB2009/054557
§ 371 (c)(1), (2), (4) Date: Apr. 18, 2011

(87) PCT Pub. No.: WO2010/046821
PCT Pub. Date: Apr. 29, 2010

(65) Prior Publication Data
US 2011/0200240 A1 Aug. 18, 2011

(30) Foreign Application Priority Data
Oct. 23, 2008 (EP) .................................... 08305720

(51) Int. Cl.
*G06K 9/00* (2006.01)
(52) U.S. Cl.
USPC ........................................................ 382/128
(58) Field of Classification Search
None
See application file for complete search history.

(56) References Cited

U.S. PATENT DOCUMENTS

| | | | | |
|---|---|---|---|---|
| 6,226,392 | B1 * | 5/2001 | Bacus et al. | 382/128 |
| 6,272,235 | B1 * | 8/2001 | Bacus et al. | 382/133 |
| 6,274,323 | B1 * | 8/2001 | Bruchez et al. | 435/6.11 |
| 6,692,916 | B2 * | 2/2004 | Bevilacqua et al. | 435/6.13 |
| 6,947,583 | B2 | 9/2005 | Ellis | |
| 7,272,252 | B2 * | 9/2007 | De La Torre-Bueno et al. | 382/133 |

(Continued)

FOREIGN PATENT DOCUMENTS

| WO | 200070541 A1 | 11/2000 |
|---|---|---|
| WO | 2008005426 A2 | 1/2008 |

OTHER PUBLICATIONS

Yagi, Yukako et al "Digital Imaging in Pathology for Standardization", Sep. 2008.

(Continued)

*Primary Examiner* — Nancy Bitar

(57) ABSTRACT

A method of determining a color transformation for images of biological material includes preparing a first set of biological test objects using a first preparation method, and preparing a second set of biological test objects using a second preparation method. Each test object in the second set of test objects corresponding to a counterpart test object in the first set of test objects, the test object and its counterpart being of the same biological type of material. For each test object in the first and second set of test objects, the color of the test object is determined thereby generating a first and second set of colors The method further includes generating a conversion table indicating a mapping between the colors in the first set of colors and the corresponding colors in the second set of colors. The first and second preparation methods include first and second staining methods, respectively.

12 Claims, 3 Drawing Sheets

(56) References Cited

U.S. PATENT DOCUMENTS

| | | |
|---|---|---|
| 7,292,718 B2 | 11/2007 | Douglass |
| 7,555,154 B2 * | 6/2009 | Fenster et al. ............... 382/133 |
| 7,558,415 B2 * | 7/2009 | McLaren et al. ............. 382/128 |
| 2001/0017938 A1 | 8/2001 | Kerschmann |
| 2003/0118222 A1 * | 6/2003 | Foran et al. ................. 382/128 |
| 2003/0165263 A1 | 9/2003 | Hamer |
| 2004/0098205 A1 | 5/2004 | Olschewski |
| 2006/0215168 A1 | 9/2006 | Gouch |
| 2010/0254581 A1 * | 10/2010 | Neeser et al. ................ 382/128 |

OTHER PUBLICATIONS

Abe, Tokiya et al "Color Correction of Pathological Images based on Dye Amount Quantification", Optical Review, vol. 12, No. 4, 2005.

Chen, Wenjin et al "Advances in Cancer Tissue Microarray Technology: Towards Improved Understanding and Diagnostics" Analytica Chimica Acta, vol. 564, No. 1, Mar. 2006, pp. 74-81.

Schmidt, Cristina et al "Engineering a Peer-to-Peer Collaboratory for Tissue Microarray Research" Proceedings of the 2nd International Worshop on Challenges of Large Applications in Distributed Environments, Dec. 2004, pp. 64-73.

Pham, Nhu-An et al "Quantitative Image Analysis of Immunohistochemical Stains using a CMYK Color Model" Diagnostic Pathology, Biomed Central, vol. 2, No. 1, Feb. 2007.

Karacali, Bilge et al "Automatic Recognition of Cell Phenotypes in Histology Images based on Membrane-and Nuclei-Targeting Biomarkers" BMC Medical Imaging Biomed Central, vol. 7, No. 1, Sep. 2007.

* cited by examiner

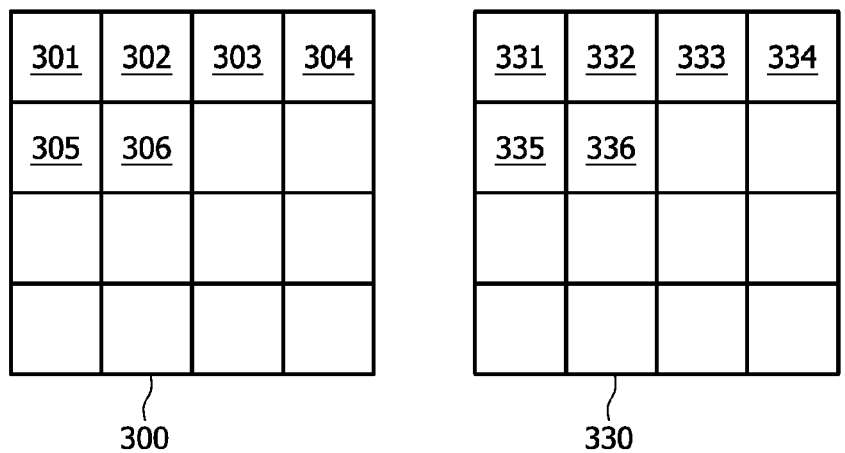
FIG. 3
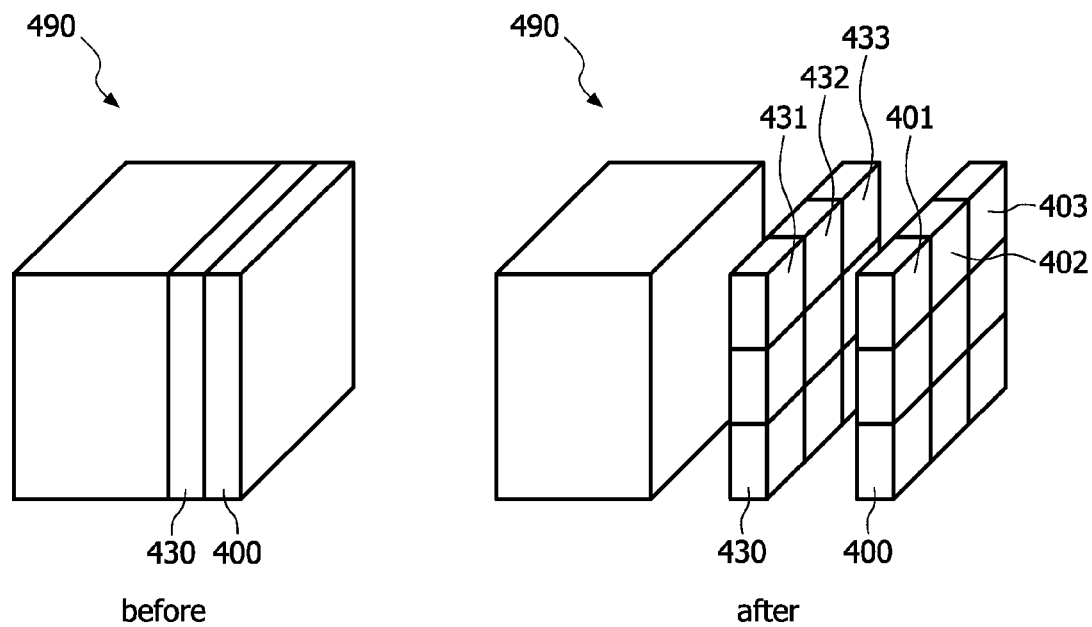
FIG. 4
FIG. 5

COLOUR MANAGEMENT FOR BIOLOGICAL SAMPLES

FIELD OF THE INVENTION

In a first aspect the invention relates to a method of determining a colour transformation for images of biological material.

In a second aspect the invention relates to a colour management method for use in microbiology, histology and pathology.

In a third aspect the invention relates to another colour management method for use in microbiology, histology and pathology.

The invention further relates to a data carrier carrying an image file.

BACKGROUND OF THE INVENTION

In such fields as microbiology, histology, and pathology samples containing biological matter such as individual cells or tissue samples are routinely investigated using microscopy, in particular transmission microscopy. The material to be imaged is usually stained in order to increase the colour contrast between different types of its constituents. Without staining, it is very difficult to see differences in cell morphology. Hematoxylin and eosin (H & E) are the most commonly used stains in histology, pathology, and microbiology. Hematoxylin colours nuclei blue, eosin colours the cytoplasm pink. For observing the tissue under a microscope, the sections are stained with one or more pigments.

There are hundreds of various special staining techniques which have been used to selectively stain cells and cellular components. Compounds for colouring tissue sections include safranin, oil red o, congo red, fast green FCF, silver salts and numerous natural and artificial dyes, which usually originate from the development of dyes for the textile industry.

Recently, antibodies have been used to visualize specifically proteins, carbohydrates and lipids. This is known as immunohistochemistry, or, when the stain is a fluorescent molecule, immunofluorescence. This technique has greatly increased the ability to identify categories of cells under a microscope. It can be combined with other advanced techniques, such as non-radioactive in-situ hybridization for identifying specific DNA or RNA molecules with fluorescent probes or tags that can be used for immunofluorescence and enzyme-linked fluorescence amplification. Fluorescence microscopy and confocal microscopy are used to detect fluorescent signals with good intracellular detail. Digital cameras are increasingly used for capturing histological and histopathological images.

A problem is that often biologists and pathologists are used to working with a certain staining method used at their laboratory and have trouble interpreting images resulting from different staining methods due to the fact that different staining methods result in different colours of the samples. For example, one pathologist is used to applying H & E at a certain ratio, while a second pathologist uses another ratio of H & E. The second pathologist may also routinely use a staining method other than H & E. In both cases the two pathologists may find it difficult to interpret each other's images.

T. Abe, et al. ["Colour correction of pathological images based on dye amount quantification", Optical Review 12, 293-300 (2005)] have proposed a colour correction method for pathological images of H & E stained samples in which the amounts of H & E dyes are estimated based on a multispectral imaging technique using the Beer-Lambert law. The colour image is generated in accordance with an adjusted amount of dyes. Thereby an image can be corrected to an arbitrary or specified optimal staining condition image. The document also describes using colour management techniques for correcting pathology images for differences between computer displays and microscopes.

In digital imaging systems, colour management is the controlled conversion between the colour representations of various devices, such as image scanners, digital cameras, monitors, TV screens, film printers, computer printers, offset presses, and corresponding media. The primary goal of colour management is to obtain a good colour match across different devices. For example, a video should appear in the same colours on a computer LCD monitor, a plasma TV screen, and a printed frame of video. Colour management helps achieving the same appearance on all of these devices, provided the devices are capable of delivering the needed colour intensities.

A disadvantage of the method proposed by Abe et al is that the spectral analysis involves a considerable experimental effort and sophisticated equipment. Furthermore it is not evident how the method could be used to convert colours resulting from H & E into colours resulting from a different type of dye.

It is an object of the invention to provide a method of determining a colour transformation for images of biological material without requiring knowledge about the way in which the biological material has been prepared. It is another object of the invention to provide a data carrier carrying an image file that allows the image to be displayed alternatively in the colours resulting from a first preparation method or in the colours resulting from a second preparation method.

These objects are achieved by the features of the independent claims. Further specifications and preferred embodiments are outlined in the dependent claims.

SUMMARY OF THE INVENTION

According to the first aspect of the invention, the method of determining a colour transformation for images of biological material comprises preparing a first set of biological test objects using a first preparation method, the set comprising at least one test object;

preparing a second set of biological test objects using a second preparation method, each test object in the second set of test objects corresponding to a counterpart test object in the first set of test objects, the test object and its counterpart being of the same biological type of material;

for each test object in the first set of test objects, determining a colour of the test object, thereby generating a first set of colours;

for each test object in the second set of test objects, determining a colour of the test object, thereby generating a second set of colours, generating a conversion table indicating a mapping between the colours in the first set of colours and the corresponding colours in the second set of colours.

The colour of each of the test objects in the first set of test objects and in the second set of test objects may be derived from an image of the test object. The image may, for example, be a digital image or an image on a photographic film. The test objects in each of the first and the second set of test objects may be imaged separately, or an image may be taken of the entire first set of test objects and the entire second set of test objects. Also it is possible to generate an image featuring both the first set of test objects and the second set of test objects.

The first preparation method and the second preparation method may comprise a first staining method and a second staining method, respectively. The first staining method and/or the second staining method may in particular comprise employing hematoxylin and eosin or any other known type of dye. More generally, the first preparation method and the second preparation method may comprise any additional steps other than staining that are required to prepare the test objects starting from crude biological material.

The method may comprise preparing a first sample containing the first set of biological test objects, and preparing a second sample containing the second set of biological test objects. The samples may be fluid or solid, and they may contain in addition to the biological test objects other biological material or embedding material. The first sample and the second sample may be arranged on a single microscope slide, or they may be arranged on separate microscope slides. It is pointed out that not every component (e.g. not every tissue sample or every cell) contained in the samples is necessarily used to determine the conversion table. Such components which are not used are not considered members of the first set of biological test objects or the second set of biological test objects, respectively.

The method may comprise staining the first sample by a first staining method, and staining the second sample by a second staining method. The first staining method may differ from the second staining method in the composition and/or concentration of the stains involved, in the duration of application, or in any other characteristic which influences the colours of the resulting images.

The method may comprise creating a hardened block containing biological material, wherein preparing the first sample comprises cutting from the hardened block a first slice, and preparing the second sample comprises cutting from the hardened block a second slice parallel to the first slice. Thereby two very similar samples may be created, which will facilitate comparing their colours. The first slice and the second slice may be stained by a first staining method and by a second staining method, respectively. If the two samples are sufficiently similar, a colour conversion table may be determined by performing a pixel-by-pixel analysis of digital images of the two simples. More precisely, the colour value of a specific pixel of the image of the first sample may be memorized in conjunction with the colour value of a corresponding pixel of the image of the second sample. Preferably the two digital images have the same format (i.e. the same numbers of pixel rows and pixel columns). It is also noted that more than two similar slices can be easily produced. The slices may be further treated individually. In particular each slice may be subjected to a particular staining method. A colour transformation may then be determined for each of the possible pairs of samples.

The method may further comprise determining a set of regions of the first slice and a set of corresponding regions of the second slice, such that each region in the set of regions of the first slice and its corresponding region in the set of regions of the second slice comprise the same biological type of material, wherein the set of regions of the first slice provides the first set of test objects and the set of regions of the second slice provides the second set of test objects. In particular, the set of regions of the first slice and the set of corresponding regions of the second slice may each be arranged according to a lattice. Thereby identifying the first set of test objects and the second set of test objects is facilitated.

The first sample and the second sample may comprise a first array of tissue samples and a second array of tissue samples, respectively, the first array of tissue samples providing the first set of test objects and the second array of tissue samples providing the second set of test objects. Each array may in particular comprise different types of tissue. For example, each array may comprise breast, kidney and skin tissue and it may comprise both healthy and diseased tissue. The type of tissue may be identified by a pathologist before it is included in the array. Each array may be located on a single substrate. Thus all the tissue samples in the array can be stained simultaneously, using the same procedure. Each array may in particular be a tissue micro array (TMA). The TMA may be manufactured from a block of paraffin in which several types of tissue samples have been embedded. A first slice and a second slice of the paraffin block can then be separately stained and used as the first sample and the second sample, respectively. Preferably the first slice and the second slice are practically identical in their structure.

According to a different embodiment, one of the test objects in the first set of test objects is a membrane, a wall, cytosol, or an organelle of a first cell, and its counterpart test object in the second set of test objects is a similar membrane, wall, cytosol, or organelle, respectively, of a second cell. Thus the colour conversion table may be determined from the colours of similar constituents of two or more similar cells.

The method may further comprise identifying the membrane, wall, cytosol, or organelle of the first cell; and identifying the membrane, wall, cytosol, or organelle of the second cell. The respective components of the first and second cell may, for example, be identified by analyzing images of the first cell and the second cell using a computer programme written for that purpose. The computer programme may be designed to determine those regions in the images that correspond to specific components of the cells.

It may be advantageous to represent each colour in the first set of colours by a vector in a first colour space and each colour in the second set of colours by a vector in a second colour space. Using additive colour mixing, the colour space may, for example, be a red-green-blue (RGB) colour space, having as its basis vectors red, green and blue spectral colours. Alternatively, subtractive colour mixing may be used. In this case the colour space may, for example, be a cyan-magenta-yellow-black (CMYK) colour space.

The first colour space and the second colour space may be the same. This allows representing the mapping between the first set of colours and the second set of colours in a particularly simple and accurate form.

If the colour space is of dimension N, as is the case, for example, with the well-known three-dimensional RGB colour space (where N=3), the method may comprise selecting in the first set of colours a first subset of N colours, the second set of colours having a corresponding second subset of N colours; and computing an N-times-N matrix that maps the N colour vectors representing the colours of the first subset into the corresponding N colour vectors representing the colours in the second subset. Given the N colours in the first subset and the corresponding N colours in the second subset, the N-times-N transformation matrix may be determined by solving a linear system for its components. The N-times-N matrix may then be used to generate the conversion table or portions thereof. While it may not be possible to reproduce the entire conversion table sufficiently accurately by applying the N-times-N matrix to the entire first set of colours, it may be possible to reproduce a portion of the conversion table sufficiently accurately by applying the N-times-N matrix to a sufficiently small subset of the first set of colours, the sufficiently small subset comprising sufficiently similar colours.

The colour management method according to the second aspect of the invention comprises performing the method according to the first aspect of the invention to generate a conversion table; preparing a sample containing biological material; generating an image of the sample; and transforming the colours of the image of the sample as indicated by the conversion table. To this end, the image may be represented by an array of pixels, each pixel having a specific colour. If the colour is indicated in the table, the colour transformation can be applied straightaway. Otherwise, the conversion table may need to be interpolated.

The colour management method according to the third aspect of the invention comprises performing the method according to the first aspect of the invention to generate a conversion table; preparing a sample containing biological material; generating a digital image of the sample; and writing an image file to a data carrier, the image file comprising the digital image and the conversion table. Thus the original image is stored together with the conversion data. A computer program for displaying the image on a screen or a printer may then be designed in such a manner as to allow a user to choose whether the image is to be displayed in its original colours or in its transformed colours. An alternative method comprises storing the image both in its original colours and in its transformed colours. However, this may require a larger amount of memory as compared to the proposed method of storing only the original image data together with the conversion table. The method may further comprise transmitting the image file from a first laboratory to a second laboratory.

The data carrier according to the fourth aspect of the invention carries a digital image of a sample prepared by a first method, the sample comprising biological material, and a conversion table indicating a mapping between a set of colours associated with the first method and a set of colours associated with a second method of preparing a sample. As described above, it enables a user of the image file to selectively view the image in its original colours or in its converted colours. Furthermore, the amount of memory is reduced compared to the amount of memory necessary for storing both the image in its original colours and the image in the converted colours.

BRIEF DESCRIPTION OF THE DRAWINGS

FIG. 3 illustrates, in a simplified manner, an example of a first array of tissue samples and an example of a corresponding second array of tissue samples.

FIG. 4 is a simplified representation of an example of a hardened block containing biological material.

FIG. 5 illustrates the block shown in FIG. 4 after two parallel thin slices have been cut from it.

DETAILED DESCRIPTION OF THE INVENTION

Figure 1:
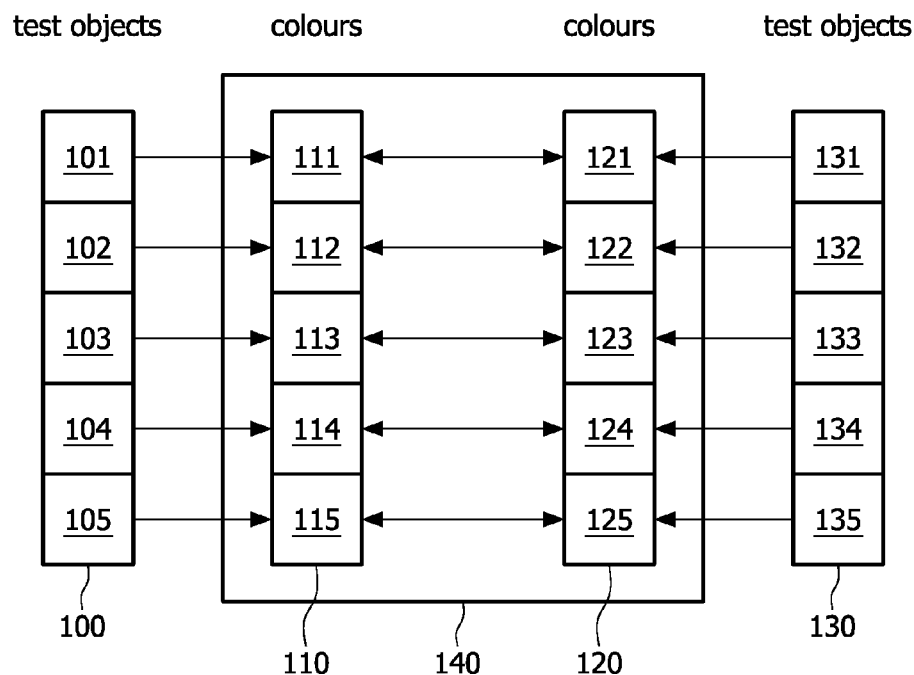
FIG. 1 schematically illustrates an example of a first set of test objects and a corresponding second set of test objects in conjunction with a first set of colours and a second set of colours defining a conversion table.

Unless specified otherwise, identical or similar reference numerals appearing in different Figures label identical or similar components.

FIG. 1 shows a first set of biological test objects 100 and a second set of biological test objects 130. The first set of test objects comprises five test objects 101, 102, 103, 104, 105 while the second set of test objects comprises five test objects 131, 132, 134, 135. Each of the test objects 101-105 in the first set of test objects 100 has a counterpart test object in the second set of test objects 130. Each test object and its respective counterpart are derived from the same type of biological material. In this sense they are similar. Test object 101 is similar to test object 131, test object 102 is similar to test object 132, test object 103 is similar to test object 133, and so on. The test objects 101 to 105 in the first set 100 have been stained by a first method, while the test objects 132 to 135 in the second set 130 have been stained by a second method. The test objects 101 to 105 in the first set 100 thus have respective colours 111 to 115 forming a first set of colours 110, while the test objects 131 to 135 in the second set of test objects have respective colours 121 to 125 forming a second set of colours 120. The list of colours 111 to 115 and the corresponding list of colours 121 to 125 together form a conversion table 140 indicating a mapping between the first set of colours 110 and the second set of colours 120. The conversion table 140 maps the colours of the first set 110 into the colours of the second set 120, and vice versa. Each of the colours in the first and the second set may be represented, for example, by a vector in a colour space, such as an RGB colour space.

It is noted that one of the sets of test objects, for example the second set of test objects 130, may be a standardized set of test objects characterized by having standard colours 121 to 125. In order to define a colour transformation between the first set of test objects 100 and a third set of test objects (not shown) having a third set of colours it may be convenient to define a colour transformation relating the third set of colours to the standard set of colours 120. The colours of the first staining method may then be transformed into the colours of the third staining method by converting them first into the colours of the standard second staining method using the conversion table 140 and then from the colours of the standard second staining method into the colours of the third staining method. By referring the colours of a particular staining method to the colours of a selected standard staining method, the collaboration between pathologists working at different laboratories may be simplified.

Figure 2:
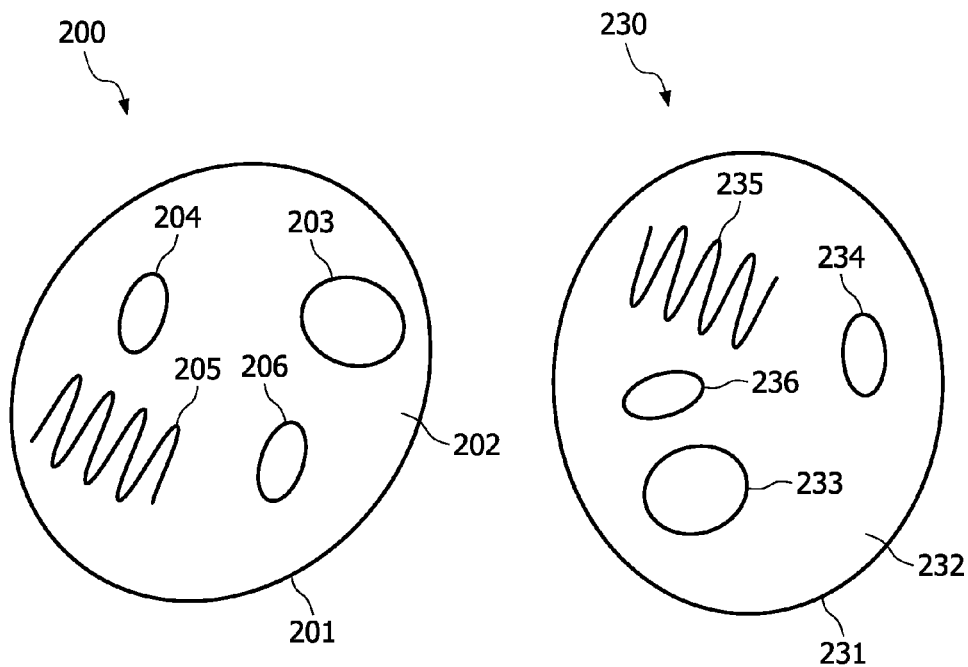
FIG. 2 illustrates in a simplified manner, an example of a first biological cell and an example of a similar second biological cell.

FIG. 2 shows a first cell 200 and a second cell 230. Each of the cells 200, 230 comprises a membrane 201, 231, cytosol 202, 232, and various organelles. The organelles shown are a nucleus 203, 233, an endoplasmic reticulum 205, 235, and mitochondria 204, 206, 234, 236. The first cell 200 is part of a sample stained by a first staining method, while the second cell 230 is part of a sample stained by a second staining method. Thus the colours of the stained cells 200, 230 differ. The shown components 201 to 206 of the first cell 200 and the shown components 231 to 236 of the second cell 230 are chosen as a first set of test objects and as a second set of test objects, respectively, for determining a colour conversion as described above with reference to FIG. 1.

FIG. 3 illustrates a first array 300 of tissue samples 301, 302, 303, . . . and a second array of tissue samples 331, 332, 333, . . . . In each of the arrays 300, 330 the tissue samples are arranged according to a rectangular lattice. Each of the arrays 300, 330 comprises a total of 16 tissue samples of which only the samples 301 to 306 have been labelled in the Figure. The tissue arrays 300, 330 are similar to each other in that they comprise the same types of biological tissue. More precisely, tissue sample 301 is of the same type as tissue sample 331, tissue sample 302 is of the same type as tissue sample 332, and so on. Thus, corresponding fields of the array 300 and the array 330 are filled with the same type of tissue. The array 300 has been stained by a first staining method while the array 330 has been stained by a second staining method. In this example, the tissue samples 301, 302, 303, . . . in the first array 300 and the corresponding tissue samples 331, 332, 333, . . . in the second array 330 form, respectively, the first set 100 of test objects and the second set 130 of test objects described above with reference to FIG. 1.

FIGS. 4 and 5 illustrate in a simplified manner a method of producing a pair of similar samples 400 and 430 that can be advantageously used for determining a colour conversion table relating the colours of a first staining method and a second staining method. In a first step, biological material is embedded in paraffin. The biological material may, for example, comprise individual biological cells or a selection of different tissue samples. The tissue samples may, for example, have been taken from different organs of the human body and comprise both healthy and diseased tissue. The tissue samples may be arranged according to a lattice as described above with reference to FIG. 3. The paraffin hardens to form a solid block 490 containing the biological material. The biological material may in particular be arranged in a tissue microarray. In a subsequent step, a first slice 400 and an adjacent second slice 430 are cut from the solid block 490 using a microtome. The slices 400, 430 are sufficiently thin so as to be substantially identical to each other. Next, the first slice 400 is stained using a first staining method while the second slice 430 is stained using a second staining method. In the present example, the components 401, 402, 403, of the first slice 400 provide the first set 100 of test objects while similar components 431, 432, 433, of the second slice 430 provide the second set 130 of test objects. A colour conversion table is determined so as to map the colours of the first set of test objects into the colours of the second set of test objects, as described above with reference to FIG. 1. It may be advantageous to cut more than two slices from the block 490, for example in order to generate colour conversion tables for different pairs of staining methods.

Figure 6:
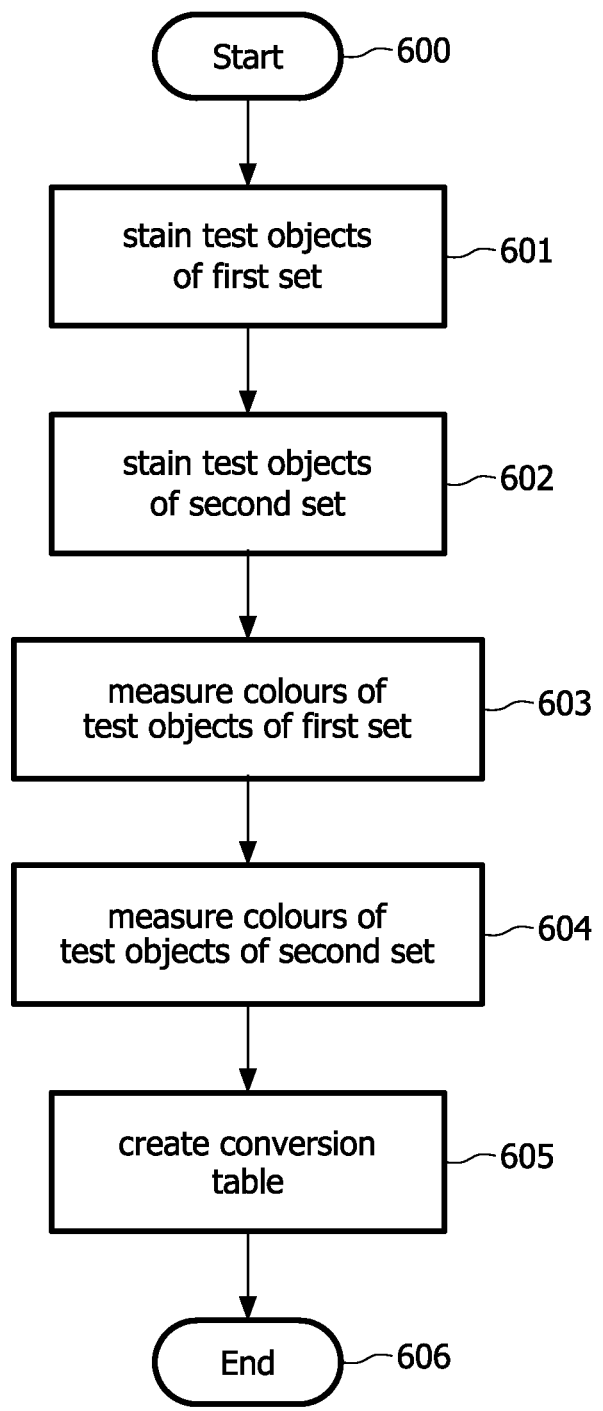
FIG. 6 is a flow chart of an example of a method according to the first aspect of the invention.

The flow chart in FIG. 6 illustrates an example of a method of determining a colour conversion table relating colours associated with a first preparation method to the colours associated with a second preparation method. In this method, a first set of biological test objects is prepared using a first preparation method, while a second set of biological test objects is prepared using a second preparation method. As part of the first preparation method, the test objects of the first set of test objects are stained using a first staining method (step 601). As part of the second preparation method, the test objects of the second set of test objects are stained using a second staining method (step 602). In subsequent steps 603, 604 the colours of the test objects of the first set and the colours of the test objects of the second set are measured. In subsequent step 605, the measured colours of the test objects of the first set of test objects and the measured colours of the test objects of the second set of test objects are stored as lists, resulting in a conversion table. The conversion table is stored on an information carrier.

Any of the steps described in the present application may be performed or controlled by a computer. To this end, a data carrier may carry machine-readable instructions for instructing the computer to perform or control these steps.

While the invention has been illustrated and described in detail in the drawings and in the foregoing description, the drawings and the description are to be considered exemplary and not restrictive. The invention is not limited to the disclosed embodiments. Equivalents, combinations, and modifications not described above may also be realized without departing from the scope of the invention.

The verb "to comprise" and its derivatives do not exclude the presence of other steps or elements in the matter the "comprise" refers to. The indefinite article "a" or "an" does not exclude a plurality of the subjects the article refers to. It is also noted that a single unit may provide the functions of several means mentioned in the claims. The mere fact that certain features are recited in mutually different dependent claims does not indicate that a combination of these features cannot be used to advantage. Any reference signs in the claims should not be construed as limiting the scope.

The invention claimed is:

1. A method of determining a color transformation for images of biological material, comprising the acts of:
    preparing a first set of biological test objects using a first staining method, the set comprising at least one test object;
    preparing a second set of the biological test objects using a second staining method, each test object in the second set of test objects corresponding to a counterpart test object in the first set of test objects, the test object and its counterpart being of the same biological type of material, wherein the first staining method is different from the second staining method;
    for each test object in the first set of test objects stained by the first staining method, determining a color of the test object, thereby generating a first set of colors;
    for each test object in the second set of test objects stained by the first staining method, determining a color of the test object, thereby generating a second set of colors;
    generating a conversion table indicating a mapping between the colors in the first set of colors resulting from the first staining method and the corresponding colors in the second set of colors resulting from the second staining method;
    preparing a first sample containing the first set of biological test objects; and
    preparing a second sample containing the second set of biological test objects; and
    creating a hardened block containing biological material;
    wherein preparing the first sample comprises cutting from the hardened block a first slice, and preparing the second sample comprises cutting from the hardened block a second slice parallel to the first slice.

2. The method as set forth in claim 1, further comprising the acts of: staining the first sample by the first staining method; and staining the second sample by the second staining method.

3. The method as set forth in claim 1, further comprising the acts of:
    determining a set of regions of the first slice and a set of corresponding regions of the second slice, such that each region in the set of regions of the first slice and its corresponding region in the set of regions of the second slice comprise the same biological type of material,
    wherein the set of regions of the first slice provides the first set of test objects and the set of regions of the second slice provides the second set of test objects.

4. The method as set forth in claim 1, wherein the first sample comprises a first array of tissue samples and the second sample comprises a second array of tissue samples, the first array of tissue samples providing the first set of test objects and the second array of tissue samples providing the second set of test objects.

5. The method as set forth in claim 1, wherein one of the test objects in the first set of test objects is a membrane, a wall, cytosol, or an organelle of a first cell, and its counterpart test object in the second set of test objects is a similar membrane, wall, cytosol or organelle, respectively, of a second cell.

6. The method as set forth in claim 5, further comprising the acts of: identifying the membrane, wall, cytosol, or organelle of the first cell; and
identifying the membrane, wall, cytosol, or organelle of the second cell.

7. The method as set forth in claim 1, further comprising the acts of: representing each color in the first set of colors by a vector in a first color space; and
representing each color in the second set of colors by a vector in a second color space.

8. The method as set forth in claim 7, wherein the first color space and the second color space are the same.

9. The method as set forth in claim 8, wherein the color space is of dimension N and the method further comprises the acts of:
selecting in the first set of colors a first subset of N colors, the second set of colors having a corresponding second subset of N colors;
computing an N-times-N matrix that maps the N color vectors representing the colors in the first subset into the N corresponding color vectors representing the colors in the second subset.

10. A color management method for use in microbiology, histology and pathology, comprising the acts of:
generating a conversion table by performing the acts of:
preparing a first set of biological test objects using a first staining method, the set comprising at least one test object;
preparing a second set of the biological test objects using a second staining method, each test object in the second set of test objects corresponding to a counterpart test object in the first set of test objects, the test object and its counterpart being of the same biological type of material, wherein the first staining method is different from the second staining method; for each test object in the first set of test objects stained by the first staining method, determining a color of the test object, thereby generating a first set of colors;
for each test object in the second set of test objects stained by the first staining method, determining a color of the test object, thereby generating a second set of colors; and
generating a conversion table indicating a mapping between the colors in the first set of colors resulting from the first staining method and the corresponding colors in the second set of colors resulting from the second staining method;
preparing a first sample containing the first set of biological test objects; and
preparing a second sample containing the second set of biological test objects; and
creating a hardened block containing biological material;
generating an image of one sample of the first sample and the second sample; and
transforming the colors of the image of the one sample as indicated by the conversion table,
wherein preparing the first sample comprises cutting from the hardened block a first slice, and preparing the second sample comprises cutting from the hardened block a second slice parallel to the first slice.

11. The color management method of claim 10, wherein the act of generating the image of the one sample generates a digital image of the one sample; and the method further comprises the act of writing an image file to a data carrier, the image file comprising the digital image and the conversion table.

12. A non-transitory computer readable medium embodying comprising computer instructions which, when executed by a processor, configure the processor to perform the acts of:
preparing a first set of biological test objects using a first staining method, the set comprising at least one test object;
preparing a second set of the biological test objects using a second staining method, each test object in the second set of test objects corresponding to a counterpart test object in the first set of test objects, the test object and its counterpart being of the same biological type of material, wherein the first staining method is different from the second staining method;
for each test object in the first set of test objects stained by the first staining method, determining a color of the test object, thereby generating a first set of colors;
for each test object in the second set of test objects stained by the first staining method, determining a color of the test object, thereby generating a second set of colors; and
generating a conversion table indicating a mapping between the colors in the first set of colors resulting from the first staining method and the corresponding colors in the second set of colors resulting from the second staining method;
preparing a first sample containing the first set of biological test objects; and
preparing a second sample containing the second set of biological test objects; and
creating a hardened block containing biological material;
wherein preparing the first sample comprises cutting from the hardened block a first slice, and preparing the second sample comprises cutting from the hardened block a second slice parallel to the first slice.

* * * * *